US012597543B2

(12) United States Patent
Slimani et al.

(10) Patent No.: US 12,597,543 B2
(45) Date of Patent: *Apr. 7, 2026

(54) METHOD FOR MAKING SPINEL FERRITE SUPERPARAMAGNETIC COMPOSITE

(71) Applicant: Imam Abdulrahman Bin Faisal University, Dammam (SA)

(72) Inventors: Yassine Slimani, Dammam (SA); Munirah Abdullah Almessiere, Dammam (SA); Abdulhadi Baykal, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/942,358

(22) Filed: Nov. 8, 2024

(65) Prior Publication Data

US 2025/0069788 A1 Feb. 27, 2025

Related U.S. Application Data

(60) Continuation of application No. 18/791,804, filed on Aug. 1, 2024, now Pat. No. 12,183,494, which is a (Continued)

(51) Int. Cl.
*H01F 1/34* (2006.01)
*H01F 1/36* (2006.01)
(Continued)

(52) U.S. Cl.
CPC .............. *H01F 1/342* (2013.01); *H01F 7/06* (2013.01); *B82Y 25/00* (2013.01); *B82Y 40/00* (2013.01)

(58) Field of Classification Search
CPC . H01F 1/342; H01F 1/34; H01F 1/344; H01F 1/36; H01F 7/06; B82Y 25/00; B82Y 40/00
See application file for complete search history.

(56) References Cited

U.S. PATENT DOCUMENTS 12,100,538 B2 * 9/2024 Slimani ..................... H01F 7/06
12,183,494 B2 * 12/2024 Slimani ..................... H01F 7/06
2004/0014860 A1 1/2004 Meier

FOREIGN PATENT DOCUMENTS

CN 102010191 B 10/2011
CN 104213250 B 8/2016

OTHER PUBLICATIONS

Patri Tirupathi, et al., "Magneto-Electric Properties of $0.5Zn_{0.5}Co_{0.5}Fe_2O_4$—$0.5BaTiO_3$ Composite Powder", Physics Procedia, International Conference on Magnetic Materials and Applications, Magma, vol. 54, 2014, pp. 145-151.

(Continued)

*Primary Examiner* — Matthew E. Hoban
*Assistant Examiner* — Lynne Edmondson
(74) *Attorney, Agent, or Firm* — Oblon, McClelland, Maier & Neustadt, L.L.P.

(57) ABSTRACT

A magnetoelectric multiferroic nanocomposite. The nanocomposite comprises a ferroelectric perovskite oxide and a rare-earth substituted mixed ternary transition metal ferrite of the formula $A_{1-x}B_xR_yFe_{2-y}O_4$. The nanocomposite has a high dielectric constant, low dielectric loss, both stable over a wide frequency range. These properties may make the nanocomposite desirable for applications in microelectronic devices, sensors and antennas.

18 Claims, 6 Drawing Sheets

Related U.S. Application Data continuation of application No. 18/351,519, filed on Jul. 13, 2023, now Pat. No. 12,100,538, which is a division of application No. 17/314,087, filed on May 7, 2021, now Pat. No. 11,869,693.

(51) Int. Cl.

| | |
|---|---|
| *H01F 7/06* | (2006.01) |
| *B82Y 25/00* | (2011.01) |
| *B82Y 40/00* | (2011.01) |

(56) References Cited

OTHER PUBLICATIONS

Sreenivasulu Pachari, et al., "Improved magneto-capacitance response in combustion derived $BaTiO_3$-($CoFe_2O_4$/$ZnFe_2O_4$/$Co_{0.5}Zn_{0.5}Fe_2O_4$) composites", Journal of Alloys and Compounds, vol. 784, May 5, 2019, pp. 897-905 (Abstract only).

Richa Sharma, et al., "Structural, dielectric, ferromagnetic, ferroelectric and ac conductivity studies of the $BaTiO_3$—$CoFe_{1.8}Zn_{0.2}O_4$ multiferroic particulate composites", Ceramics International, vol. 40, Issue 7, Part A, Aug. 2014, pp. 9027-9036 (Abstract only).

Mehraj ud Din Rather, et al., "Improved magnetoelectric effect in ytterbium doped $BaTiO_3$—$CoFe_2O_4$ particulate multiferroic composites", Journal of Alloys and Compounds, vol. 755, Jul. 30, 2018, pp. 89-99 (Abstract only).

Want et al., "Dielectric, ferroelectric and magnetic behavior of BaTiO3—BaFe12O19 composite", J. Mater. Sci: Mater Electron 27, pp. 5860-5866. (Year: 2016).

* cited by examiner

FIG. 2A.                              FIG. 2B.
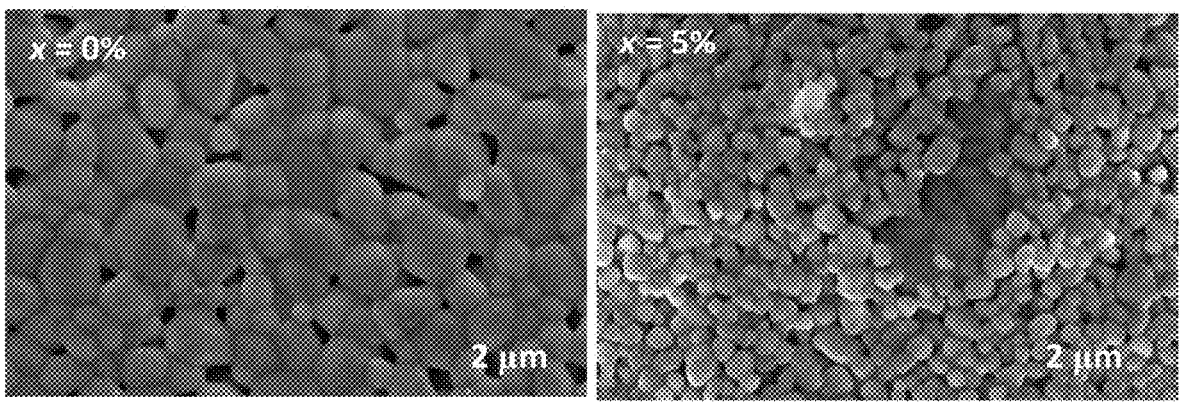
FIG. 2C.                              FIG. 2D.
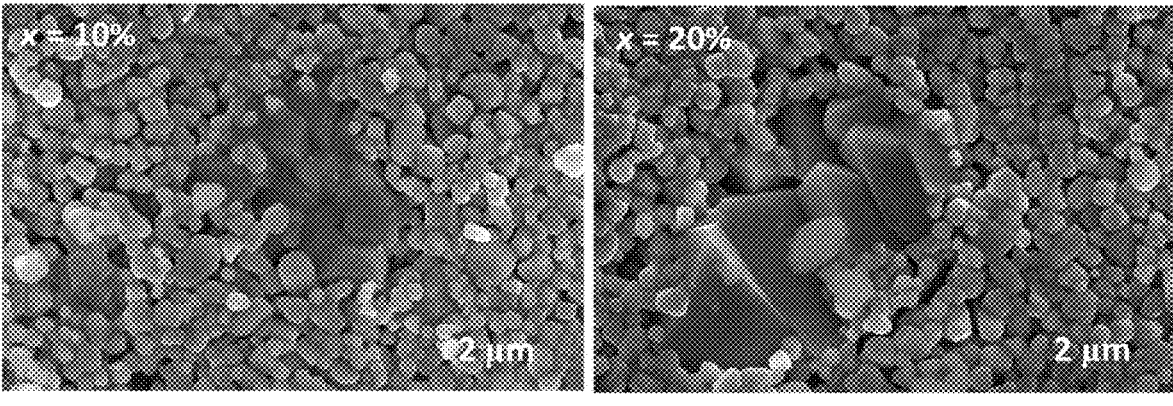
FIG. 2E.
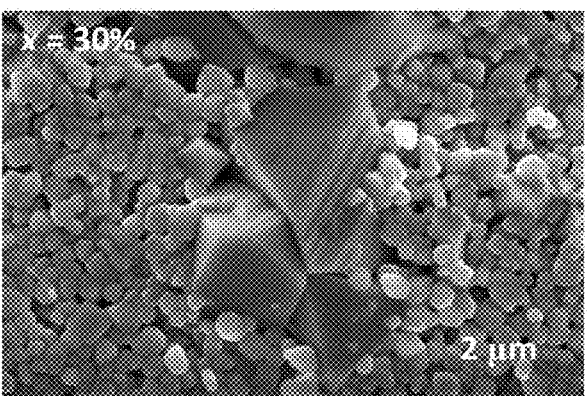

METHOD FOR MAKING SPINEL FERRITE SUPERPARAMAGNETIC COMPOSITE

CROSS-REFERENCE TO RELATED APPLICATIONS

The present application is a Continuation of U.S. application Ser. No. 18/791,804, now allowed, having a filing date of Aug. 1, 2024, which is a Continuation of U.S. application Ser. No. 18/351,519, now U.S. Pat. No. 12,100, 538, having a filing date of Jul. 13, 2023 which is a Division of U.S. application Ser. No. 17/314,087, now U.S. Pat. No. 11,869,693, having a filing date of May 7, 2021.

BACKGROUND OF THE INVENTION

Field of the Invention

The present disclosure relates to a magnetoelectric multiferroic nanocomposite comprising a ferroelectric perovskite oxide and a rare-earth substituted mixed ternary transition metal ferrite and a method of its preparation.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The ability to manipulate the magnetic properties of magnetoelectric multiferroic materials through the use of an electric field and vice-versa makes them suitable materials for numerous applications such as ME sensors, high-frequency filters, and actuators, among others [H. Yang, et. al., Sci. Rep., 7 (2017), p. 44855; and J. Jin, et. al., Adv. Funct. Mater., 24 (2014), p. 1067-1073]. There exist many single-phase multiferroic materials including $BiFeO_3$, $BiMnO_3$, $ReMn_2O_5$ (Re=Eu, Gd), $ReMnO_3$ (Re=Tb, Ho), and $Cr_2O_3$ [S. Wohlrab, et. al., J. Exp. Nanosci., 3 (2008), p. 1-15]. However, the applications of these materials are too limited due to their weak intrinsic magnetoelectric effect [E. V. Ramana, et. al., Dalt. Trans., 43 (2014), p. 9934]. A wide variety of strategies have been relied upon in order to enhance the properties of magnetoelectric multiferroic materials. One such approach is to combine a ferroelectric material with a magnetic material to form a multiferroic composite. Compared to single multiferroic, the composites prepared by combining suitable magnetic and ferroelectric phases provide excellent properties expanding their use in multifunctional device applications and drug delivery targeting with higher specificity, etc. [D. K. Pradhan, et. al., J. Phys. Chem. C, 120 (2016), p. 1936-1944].

Recently, scientists have been investigating lead-free alternatives. Among these, $BaTiO_3$ (BTO), which may exist in the perovskite structure, is the top potential alternative to lead-based materials. BTO may exist in either a tetragonal polymorph or a cubic polymorph, both with distinct electronic properties. It exhibits a tetragonal phase that reaches $T_c \approx 130°$ C. and transforms to cubic afterwards at elevated temperatures. There have been extensive studies on BTO due to its robust piezoelectric, dielectric, and permittivity dependent on set temperature. Numerous studies have been carried out on magnetoelectric multiferroic composites by selecting BTO as a source of the ferroelectric phase and combining it with a magnetic material. Some of the composites that have been reported in the literature are $BaTiO_3/MgFe_2O_4$ [R. Köferstein, et. al., J. Alloys Compd., 638 (2015), p. 141-147], core-shell composites of $CaFe_2O_4/BaTiO_3$ [T. Woldu, et. al., J. Alloys Compd., 691 (2017), p. 644-652], core-shell composites of $Ni_{0.5}Zn_{0.5}Fe_2O_4/BaTiO_3$ [L. P. Curecheriu, et. al., J. Appl. Phys., 107 (2010), p. 104106], core-shell composites of $CoFe_2O_4/BaTiO_3$ [A. Chaudhuri, et. al., J. Magn. Magn Mater., 377 (2015), p. 441-445], and $BaTiO_3/SrCaMgFeO$ [Y. Slimani, et. al., J. Magn. Magn Mater., 377 (2020), p. 166933]. The properties of these composites can be adjusted by regulating the amount of the individual phases, the type, and the magnetic properties of the magnetic phase to be mixed with the BTO phase.

Among the various magnetic materials available, the mixed spinel ferrites are of interest due to their advantageous electrical and magnetic properties with regard to applications in materials for electronics applications [F. Gözüak, et. al., J. Magn. Magn. Mater, 321 (2009), p. 2170-2177]. The physical and chemical features of ferrites can be influenced by many factors such as the synthesis method, the morphology development, the crystallite size variation, and any dopants incorporated. In some ferrites, doping using Rare Earth (RE) elements can have effects on the magnetic properties of these materials, however, such effects are difficult to predict. For example, previous work, [M. A. Almessiere, et. al., Results in Physics, 13 (2019), p. 102166], reported the synthesis of Sr hexaferrites substituted by thulium ion ($Tm^{3+}$) elements with lower coercivity values and lower saturation magnetization values as doping level increased. In thulium-doped cobalt ferrite, however, saturation magnetization increased but coercivity decreased for 2% doping levels. Higher doping levels showed lower saturation magnetization but increased coercivity, highlighting the complex, unpredictable magnetic behavior in these systems [A. Almessiere, et. al. Ultrasonics Sonochemistry, 54 (2019), p 1-10]

SUMMARY OF THE INVENTION

The present disclosure relates to a nanocomposite comprising a ferroelectric perovskite oxide and a rare-earth substituted mixed ternary transition metal ferrite of the formula $A_{1-x}B_xR_yFe_{2-y}O_4$, wherein A and B represent different transition metals, $0<x<1$, R is a rare-earth element, $0<y<0.2$, and the rare-earth substituted mixed ternary transition metal ferrite is superparamagnetic at 0 to 50° C.

In some embodiments, the ferroelectric perovskite oxide is lead-free $BaTiO_3$.

In some embodiments, the ferroelectric perovskite oxide is present in the form of particles having a mean particle size less than 1000 nm.

In some embodiments, A is cobalt.

In some embodiments, B is zinc.

In some embodiments, $0.1 \leq x < 0.5$.

In some embodiments, the rare-earth substituted mixed ternary transition metal ferrite is substantially free of nickel.

In some embodiments, R is thulium.

In some embodiments, $0.001 \leq y \leq 0.1$

In some embodiments, the rare-earth substituted mixed ternary transition metal ferrite is present in the form of particles having a mean particle size of 10 nm to 5 µm.

In some embodiments, a molar ratio of the rare-earth substituted mixed ternary transition metal ferrite to the ferroelectric perovskite oxide is 0.05:1 to 0.5:1.

In some embodiments, the nanocomposite has a dielectric constant (F') of 10 to 15 for frequencies of $10^0$ to $10^6$ Hz at 0 to 140° C.

In some embodiments, the nanocomposite has a dielectric loss tangent of 0 to 0.1 for frequencies of $10^0$ to $10^6$ Hz at 0 to 140° C.

In some embodiments, the nanocomposite has a band gap of 1.40 to 2.5 eV.

In some embodiments, the nanocomposite has a saturation magnetization of 1 to 15 emu/g at 0 to 50° C. and a magnetic coercivity of 10 to 2000 Oe at 0 to 50° C.

The present disclosure also relates to a method of forming the nanocomposite of claim 1, the method comprising mixing ferroelectric perovskite oxide particles and rare-earth substituted mixed ternary transition metal ferrite particles to form a particle mixture, milling the particle mixture to form a precursor powder, pressing the precursor powder to form a pellet, and sintering the pellet to form the nanocomposite.

In some embodiments, the pressing is performed at 900 to 1100 MPa.

In some embodiments, the sintering is performed at 850 to 1350° C. for 1 to 6 hours.

In some embodiments, A is cobalt, B is zinc, R is thulium, and the rare-earth substituted mixed ternary transition metal ferrite is prepared by mixing a cobalt (II) source, a zinc (II) source, an iron (III) source, and a thulium source in a solvent to form a precursor solution, adding a base to the precursor solution to form a reaction mixture having a pH of 11 to 12, ultrasonically treating the reaction mixture at a frequency of 18 to 25 kHz and a power of 50 to 100 W to form a precipitate, and drying the precipitate to form the rare-earth substituted mixed ternary transition metal ferrite.

In some embodiments, the cobalt (II) source is cobalt nitrate, the zinc (II) source is zinc nitrate, the iron (III) source is iron nitrate, the thulium source is thulium oxide, the base is sodium hydroxide, and the ultrasonic treatment is performed for 30 to 120 minutes.

BRIEF DESCRIPTION OF THE DRAWINGS

FIGS. 2A-2E show SEM images of $BaTiO_3/(Co_{0.7}Zn_{0.3}Tm_{0.01}Fe_{1.99}O_4)_x$ nanocomposites where FIG. 2A is for x=0%, FIG. 2B is for x=5%, FIG. 2C is for x=10%, FIG. 2D is for x=20%, and FIG. 2E is for x=30%;

FIG. 4A is for x=5, 10, 20, 30, and 100%, and FIG. 4B shows x=0;

FIG. 5A is for pure $BaTiO_3$ nanoparticles, and FIG. 5B is for $BaTiO_3/(Co_{0.7}Zn_{0.3}Tm_{0.01}Fe_{1.99}O_4)_{10\%}$ nanocomposites; FIG. 6A is for pure $BaTiO_3$ nanoparticles, and FIG. 6B is for $BaTiO_3/(Co_{0.7}Zn_{0.3}Tm_{0.01}Fe_{1.99}O_4)_{10\%}$ nanocomposites.

DETAILED DESCRIPTION OF THE INVENTION

Figure 1:
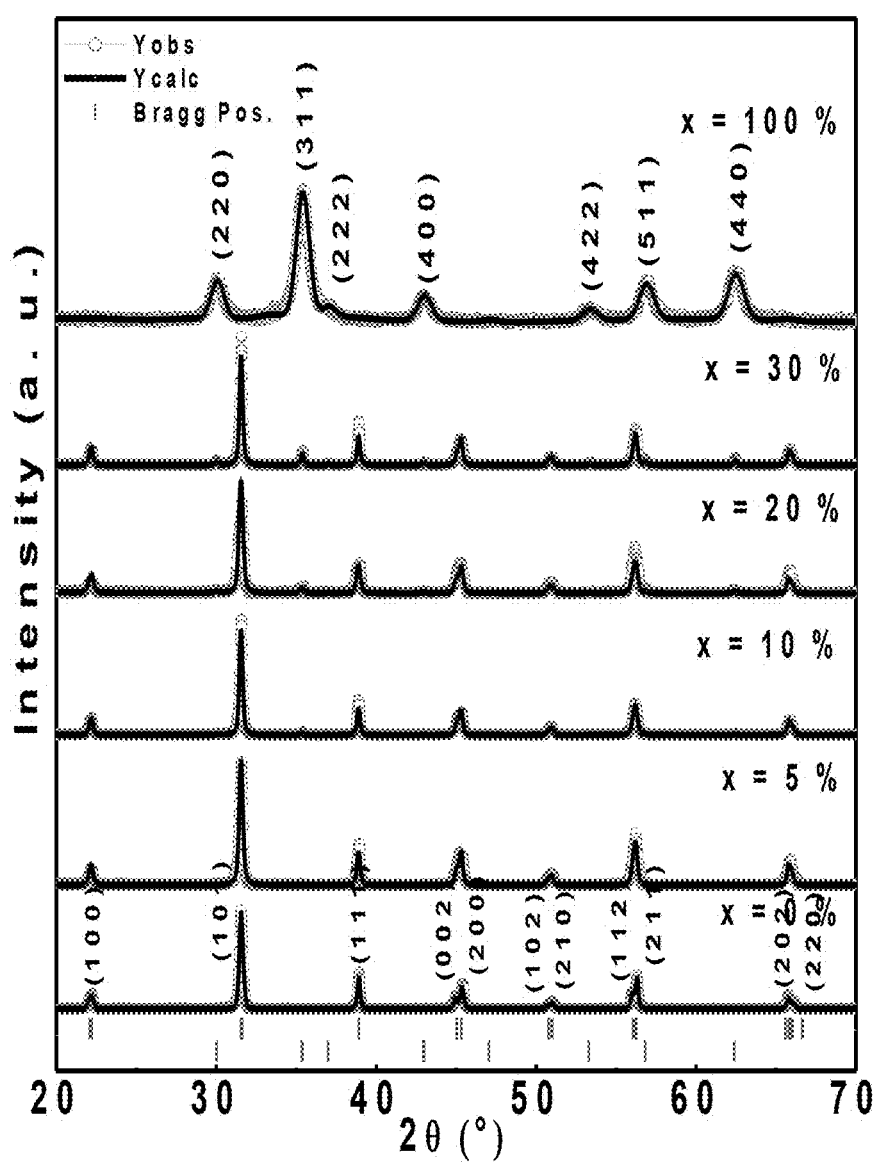
FIG. 1 shows PXRD patterns of $BaTiO_3/(Co_{0.7}Zn_{0.3}Tm_{0.01}Fe_{1.99}O_4)_x$ nanocomposites where x=0, 5, 10, 20, 30 and 100%.

In the following description, it is understood that other embodiments may be utilized and structural and operational changes may be made without departure from the scope of the present embodiments disclosed herein.

Definitions

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

According to a first aspect, the present disclosure relates to a nanocomposite, in particular a magnetoelectric multiferroic nanocomposite, comprising a ferroelectric perovskite oxide and a rare-earth substituted mixed ternary transition metal ferrite of the formula $A_{1-x}B_xR_yFe_{2-y}O_4$, wherein A and B represent different transition metals, $0<x<1$, R is a rare-earth element, $0<y<0.2$, and the rare-earth substituted mixed ternary transition metal ferrite is superparamagnetic at 0 to 140° C.

As used herein "perovskite" refers to a material which has the perovskite structure type. The perovskite structure type is a structure adopted by materials which have the general formula $ABX_3$, where A and B are cations which have a ratio of charge on cation A to charge on cation B of 1:2 and X is an anion. Typical ion charge combinations are $A+B^{2+}X^-_3$ and $A^{2+}B^{4+}X^{2-}_3$. The perovskite structure type is characterized by the presence of an octahedral coordination of the B cation by X anions. These octahedra are arranged in a cubic lattice and are vertex-sharing. The A cations occupy pockets with cubic symmetry defined by 8 of the octahedra. Typically, the arrangement of the octahedra and A cations forms a material with cubic symmetry, however slight distortions may lower the symmetry of the material, for example to tetragonal or orthorhombic. Examples of such distortions include shifts of the B cations such that they are not in the center of the octahedra (off-centering) and tilting of the octahedra such that the center of the octahedra remain in a cubic arrangement, but the orientation of the octahedra results in a non-cubic symmetry. The perovskite structure type is named after a mineral called perovskite, composed of calcium titanate ($CaTiO_3$), which crystallizes in the cubic perovskite structure type. The aforementioned mineral is a member of the class of materials known as "perovskites". Examples of other perovskites include simple perovskites, complex perovskites, layered perovskites, and hybrid perovskites.

Simple perovskites are perovskites which have chemical formulas which conform to the chemical formula explained above. Simple perovskites have only one type of atom occupying the B cation sites in the perovskite structure or fulfill the B cation position in the aforementioned chemical formula. Simple perovskites may have one or more type of atom occupying the A cation sites in the perovskite structure or fulfill the A cation position in the aforementioned chemical formula. Simple perovskites may have one or more type of atom occupying the X anion sites in the perovskite structure of fulfill the X anion position in the aforementioned chemical formula. This description also covers doped perovskites that are doped in both the A and X sites in the structure of A and X positions in the chemical formula. Examples of simple perovskites include calcium titanate ($CaTiO_3$, perovskite), bridgmanite (($Mg,Fe)SiO_3$), bismuth niobate ($BiNbO_3$), barium titanate ($BaTiO_3$), strontium titanate ($SrTiO_3$), strontium zirconate ($SrZrO_3$), lead titanate ($PbTiO_3$), bismuth ferrite ($BiFeO_3$), lanthanum ytterbium oxide ($LaYbO_3$), lanthanum strontium manganite (($La,Sr)MnO_3$), yttrium aluminum perovskite ($YAlO_3$, YAP), lutetium aluminum perovskite ($LuAlO_3$, LuAP), $CsPbI_3$, $CsGeBr_3$, $RbPbI_3$, $CsSnBr_3$, and $RbSbI_3$.

Complex perovskites are perovskites that have more than one type of atom occupying the B cation sites in the perovskite structure of fulfill the B cation position in the aforementioned chemical formula. Complex perovskites may be disordered complex perovskites or ordered complex perovskites. Disordered complex perovskites are complex perovskites where the B cation sites in the perovskite structure are filled with a random distribution of cations able to occupy said sites based on the chemical composition of the material. No long range ordering of the B cations exists. Examples of disordered complex perovskites include lead zirconate titanate ($Pb(Zr,Ti)O_3$, PZT), lead ferrite tantalate ($Pb(Fe,Ta)O_3$), lead scandium tantalate ($Pb(ScTa)O_3$, PST) barium manganite titanate ($Ba(Mn,Ti)O_3$, BMT), and barium manganite niobate ($Ba(Mn,Nb)O_3$, BMN). Ordered complex perovskites are complex perovskites which have long range order and symmetry to the cations occupying the B cations sites in the perovskite structure. An example of ordered complex perovskites are double perovskites, which have a 1:1 mixture of two different B cations, labeled B and B'. Double perovskites are denoted with the formula $AB_{0.5}B'_{0.5}X_3$ or $A_2BB'X_6$. Double perovskites have a similar crystalline unit cell as perovskites, but with dimensions that are twice as large as the parent, simple perovskites. Other examples of ordered complex perovskites have B:B' cation ratios of 1:2 ($AB_{0.33}B'_{0.67}X_3$) or 1:3 ($AB_{0.25}B'_{0.75}X_3$).

Examples of ordered complex perovskites include $Sr_2FeMoO_6$, $Sr_2NiIrO_6$, and $BaZn_{0.33}Ta_{0.67}O_3$.

Layered perovskites are materials in which sheets of the $ABX_3$ structure are separated by sheets of a different material. Layered perovskites may be classified based on the chemical formula of the different material into Aurivillius phase, Dion-Jacobson phase, and Ruddlesden-Popper phase layered perovskites. Aurivillius phase layered perovskites are materials in which the different material comprises $[Bi_2O_2]^{2+}$ ions occurring every n layers (where n is an integer from 1 to 5) to give a material with the overall formula $Bi_2A_{(n-1)}B_nO_{(3n+3)}$ or $[Bi_2O_2]-A_{(n-1)}BnO_{(3n+1)}$. Examples of Aurivillius phase layered perovskites include $[Bi_2O_2]BiTi_2O_7$, $Bi_2MoO_6$, and $SrBi_2Nb_2O_9$. Dion-Jacobson phase layered perovskites are materials in which the different material is composed of an alkali metal layer ever n layers (where n is an integer from 1 to 5) to give a material with the overall formula $MA_{(n-1)}B_nO_{(3n+1)}$ where M is an alkali metal. Examples of Dion-Jacobson phase layered perovskites include $KLaNb_2O_7$, $CsLaNb_2O_7$, $CsBa_2Ta_3O_{10}$, and $KSr_2Nb_3O_{10}$. Ruddlesden-Popper phase layered perovskites are materials in which the different material is a layer of cations A', which may be any cations that would occupy an A cation site in a perovskite material, occurring every n layers, where n=1 or 2, giving the material the overall formula $A'_nA_{(n-1)}BnO_{(3n+1)}$. Examples of Ruddlesden-Popper layered perovskites include $Sr_2RuO_4$, $Sr_3Ru_2O_7$, $Sr_2TiO_4$, $Ca_2MnO_4$, and $SrLaAlO_4$.

Hybrid perovskites are perovskite materials in which one or more of the cations is an organic cation such as ammonium, organoammonium, formamidinium. Examples of hybrid perovskites include methylammonium lead iodide ($CH_3NH_3PbI_3$), methylammonium tin bromine ($CH_3NH_3SnBr_3$), and formamidinium lead iodide ($NH_2CHNH_2PbI_3$).

It should be noted that halide perovskites such as the examples listed above, are not envisioned as being part of the invention in any embodiment. While halide perovskites may display ferroelectric behavior, such materials are not oxides. Thus, they may not act as the ferroelectric perovskite oxide component.

In general, the ferroelectric perovskite oxide may be any suitable perovskite oxide, as defined above, which displays ferroelectric behavior. Examples of ferroelectric perovskite oxides include, but are not limited to barium titanate ($BaTiO_3$), lithium niobate ($LiNbO_3$), bismuth ferrite ($BiFeO_3$), lead titanate ($PbTiO_3$), lead zirconate ($PbZrO_3$), sodium bismuth titanate ($Na_{0.5}Bi_{0.5}TiO_3$), lead zirconate titanate ($Pb(Zr,Ti)O_3$, PZT), lead bismuth niobate ($PbBi_2Nb_2O_9$), strontium bismuth tantalate ($SrBi_2Ta_2O_9$), and bismuth titanate ($Bi_4Ti_3O_{12}$). In some embodiments, the ferroelectric perovskite oxide is substantially free of lead. In preferred embodiments, the ferroelectric perovskite oxide is barium titanate ($BaTiO_3$).

In some embodiments, the ferroelectric perovskite oxide is present in the form of particles. In general, the ferroelectric perovskite oxide particles can be any shape known to one of ordinary skill in the art. Examples of suitable shapes the ferroelectric perovskite oxide particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, blocks, flakes, discs, granules, angular chunks, and mixtures thereof. Nanorods or nanowires are not a shape that the ferroelectric perovskite oxide particles are envisioned as having in any embodiments.

In some embodiments, the ferroelectric perovskite oxide particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of ferroelectric perovskite oxide particles having a different shape. As used herein, the term "non-uniform shape" refers to an average consistent shape that differs by more than 10% of the distribution of ferroelectric perovskite oxide particles having a different shape. In one embodiment, the shape is uniform and at least 90% of the ferroelectric perovskite oxide particles are spherical or substantially circular, and less than 10% are polygonal. In another embodiment, the shape is non-uniform and less than 90% of the ferroelectric perovskite oxide particles are spherical or substantially circular, and greater than 10% are polygonal.

In some embodiments, the ferroelectric perovskite oxide particles have a mean particle size of less than 1000 nm, preferably less than 900 nm, preferably less than 800 nm, preferably less than 700 nm, preferably less than 600 nm, preferably less than 500 nm. In embodiments where the ferroelectric perovskite oxide particles are spherical, the particle size may refer to a particle diameter. In embodiments where the ferroelectric perovskite oxide particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the ferroelectric perovskite oxide particles have an anisotropic shape such as nanorods, the particle size may refer to a length of the nanorod, a width of the nanorod, or an average of the length and width of the nanorod. In some embodiments, the particle size refers to the diameter of a sphere having an equivalent volume as the particle.

In some embodiments, the ferroelectric perovskite oxide particles are monodisperse, having a coefficient of variation or relative standard deviation, expressed as a percentage and defined as the ratio of the particle size standard deviation (σ) to the particle size mean (μ) multiplied by 100 of less than 25%, preferably less than 10%, preferably less than 8%, preferably less than 6%, preferably less than 5%, preferably less than 4%, preferably less than 3%, preferably less than 2%. In some embodiments, the ferroelectric perovskite oxide particles of the present disclosure are monodisperse having a particle size distribution ranging from 80% of the average particle size to 120% of the average particle size, preferably 90-110%, preferably 95-105% of the average particle size. In some embodiments, the ferroelectric perovskite oxide particles are not monodisperse.

The rare-earth substituted mixed ternary transition metal ferrite has a chemical formula of $A_{1-x}B_xR_yFe_{2-y}O_4$, wherein A and B represent different transition metals, $0 < x < 1$, R is a rare-earth element, and $0 < y < 0.2$. In order to satisfy charge balance requirements, in preferred embodiments, A and B are both divalent transition metals. In preferred embodiments, the rare-earth substituted mixed ternary transition metal ferrite is superparamagnetic at 0 to 140° C. The magnetic ordering in ferrite materials can be affected by factors such as the composition of the ferrite (including dopant materials) and particle size. In general, the rare-earth substituted mixed ternary transition metal ferrite may be of any suitable composition and/or particle size so as to remain superparamagnetic at temperatures 0 to 50° C., preferably 5 to 45° C., preferably 10 to 40° C., preferably 15 to 35° C., preferably 20 to 30° C. A magnetic nanomaterial may be characterized by its blocking temperature, the temperature at which the magnetic behavior of the material changes from superparamagnetic to ferromagnetic/ferromagnetic. In some embodiments, the rare-earth substituted mixed ternary transition metal ferrite particles have a blocking temperature below 20° C., preferably at extremely low temperatures, such as below 15° C., preferably below 10° C., preferably below 5° C., preferably below 0° C., preferably below −10° C., preferably below −25° C., preferably below −50° C., preferably below −78° C., preferably below −100° C.

In some embodiments, A and B are different transition metals selected from the group consisting of Ti, Zr, Hf, Co, Zn, Ni, Mn, Fe, Cr, and Cu. In preferred embodiments, A is cobalt. In preferred embodiments, B is zinc. In some embodiments, $0.1 \leq x < 0.5$, preferably $0.15 \leq x < 0.45$, preferably $0.2 \leq x < 0.4$, preferably $0.225 \leq x < 0.375$, preferably $0.25 \leq x < 0.35$, preferably $0.275 \leq x < 0.325$, preferably $0.29 \leq x < 0.31$, preferably $x = 0.3$. In some embodiments, the rare-earth substituted mixed ternary transition metal ferrite is substantially free of nickel. In preferred embodiments, the rare-earth substituted mixed ternary transition metal ferrite is devoid of nickel. Preferably, the rare-earth substituted mixed ternary transition metal ferrite is $Co_{0.7}Zn_{0.3}R_yFe_{2-y}O_4$, where R is a rare-earth element, and $0 < y < 0.2$.

In some embodiments, the rare-earth substituted mixed ternary transition metal ferrite crystallizes in the spinel crystal structure. The spinel crystal structure is characterized by a cubic close packed lattice of anions (in this case oxygen anions), in which the cations (A, B, R, and Fe) occupy some or all of the tetrahedral sites and octahedral sites. In the normal spinel structure, divalent cations occupy tetrahedral holes and trivalent cations occupy octahedral holes. In the inverse spinel structure, the divalent cations occupy octahedral holes while half of the trivalent cations occupy octahedral holes, and the other half of the trivalent cations occupy tetrahedral holes. Intermediate structures between these end members with different cation ordering schemes also exist, including random cation distribution (also known as cation disordered structures). In some embodiments, the rare-earth substituted mixed ternary transition metal ferrite crystallizes in the normal spinel structure. In alternative embodiments, the rare-earth substituted mixed ternary transition metal ferrite crystallizes in the inverse spinel structure. In other alternative embodiments, the rare-earth substituted mixed ternary transition metal ferrite crystallizes in an intermediate spinel structure.

In preferred embodiments, the rare-earth element is thulium. In preferred embodiments, $0.001 \leq y \leq 0.1$, preferably $0.002 \leq y \leq 0.09$, preferably $0.003 \leq y \leq 0.08$, preferably $0.004 \leq y \leq 0.07$, preferably $0.005 \leq y \leq 0.06$, preferably $0.006 \leq y \leq 0.05$, preferably $0.007 \leq y \leq 0.04$, preferably $0.008 \leq y \leq 0.03$, preferably $0.009 \leq y \leq 0.02$, preferably $y = 0.01$.

In preferred embodiments, rare-earth substituted mixed ternary transition metal ferrite is $Co_{0.7}Zn_{0.3}Tm_{0.01}Fe_{1.99}O_4$.

In some embodiments, the rare-earth substituted mixed ternary transition metal ferrite is present in the form of particles. In general, the rare-earth substituted mixed ternary transition metal ferrite particles can be any shape known to one of ordinary skill in the art. Examples of suitable shapes the rare-earth substituted mixed ternary transition metal ferrite particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, rods (also known as nanorods), blocks, flakes, discs, granules, angular chunks, and mixtures thereof. In some embodiments, the rare-earth substituted mixed ternary transition metal ferrite particles have a uniform shape as described above. Alternatively, the shape may be non-uniform as described above. In one embodiment, the shape is uniform and at least 90% of the rare-earth substituted mixed ternary transition metal ferrite particles are spherical or substantially circular, and less than 10% are polygonal. In another embodiment, the shape is non-uniform and less than 90% of the rare-earth substituted mixed ternary transition metal ferrite particles are spherical or substantially circular, and greater than 10% are polygonal.

In some embodiments, the rare-earth substituted mixed ternary transition metal ferrite particles have a mean particle size of 10 nm to 5 µm, preferably 20 nm to 4.5 µm, preferably 30 nm to 4 µm, preferably 40 nm to 3.5 µm, preferably 50 nm to 3 µm. In embodiments where the rare-earth substituted mixed ternary transition metal ferrite particles are spherical, the particle size may refer to a particle diameter. In embodiments where the rare-earth substituted mixed ternary transition metal ferrite particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the rare-earth substituted mixed ternary transition metal ferrite particles have an anisotropic shape such as nanorods, the particle size may refer to a length of the nanorod, a width of the nanorod, or an average of the length and width of the nanorod. In some embodiments, the particle size refers to the diameter of a sphere having an equivalent volume as the particle.

In some embodiments, the rare-earth substituted mixed ternary transition metal ferrite particles are monodisperse, having a coefficient of variation or relative standard deviation, expressed as a percentage and defined as the ratio of the particle size standard deviation (a) to the particle size mean (p) multiplied by 100 of less than 25%, preferably less than 10%, preferably less than 8%, preferably less than 6%, preferably less than 5%, preferably less than 4%, preferably less than 3%, preferably less than 2%. In some embodiments, the rare-earth substituted mixed ternary transition metal ferrite particles of the present disclosure are monodisperse having a particle size distribution ranging from 80% of the average particle size to 120% of the average particle size, preferably 90-110%, preferably 95-105% of the average particle size. In some embodiments, the rare-earth substituted mixed ternary transition metal ferrite particles are not monodisperse.

In some embodiments, the nanocomposite has a molar ratio of the rare-earth substituted mixed ternary transition metal ferrite to the ferroelectric perovskite oxide of 0.05:1 to 0.5:1, preferably 0.06:1 to 0.4:1, preferably 0.07:1 to 0.2:1, preferably 0.075:1 to 0.2:1, preferably 0.1:1.

In some embodiments, the nanocomposite has a dielectric constant (C') of 10 to 15, preferably 10.1 to 14, preferably 10.2 to 13, preferably 10.3 to 12.5 for frequencies of $10^0$ to $10^6$ Hz at 0 to 140° C., preferably 5 to 135° C., preferably 10 to 130° C., preferably 15 to 125° C., preferably 20 to 120° C. In some embodiments, the nanocomposite has a dielectric constant of 10 to 11, preferably 10.1 to 10.9, preferably 10.2 to 10.75 for frequencies of above $10^3$ to $10^6$ Hz at 0 to 140° C., preferably 5 to 135° C., preferably 10 to 130° C., preferably 15 to 125° C., preferably 20 to 120° C. In some embodiments, the nanocomposite has a dielectric constant of 10.5 to 13, preferably 10.6 to 12.9, preferably 10.7 to 12.8, preferably 10.8 to 12.7, preferably 10.9 to 12.6, preferably 11.05 to 12.5 for frequencies of $10^0$ to $10^3$ Hz at 0 to 140° C., preferably 5 to 135° C., preferably 10 to 130° C., preferably 15 to 125° C., preferably 20 to 120° C. In some embodiments, the dielectric constant for frequencies of $10^0$ to $10^3$ Hz increases from about 11 to about 12.5 as temperature increases from 0 to 140° C., preferably 5 to 135° C., preferably 10 to 130° C., preferably 15 to 125° C., preferably 20 to 120° C.

In some embodiments, the nanocomposite has a dielectric loss tangent of 0 to 0.1, preferably 0.001 to 0.09, preferably 0.002 to 0.08 for frequencies of $10^0$ to $10^6$ Hz at 0 to 140° C., preferably 5 to 135° C., preferably 10 to 130° C., preferably 15 to 125° C., preferably 20 to 120° C. In some embodiments, the nanocomposite has a dielectric loss tangent of 0 to 0.02, preferably 0.001 to 0.015, preferably 0.002 to 0.0125 for frequencies of $10^4$ to $10^5$ Hz at 0 to 140° C., preferably 5 to 135° C., preferably 10 to 130° C., preferably 15 to 125° C., preferably 20 to 120° C. In some embodiments, the nanocomposite has a dielectric loss tangent of 0.001 to 0.055, preferably 0.002 to 0.050, preferably 0.005 to 0.0475 for frequencies of $10^1$ to $10^2$ Hz at 0 to 140° C., preferably 5 to 135° C., preferably 10 to 130° C., preferably 15 to 125° C., preferably 20 to 120° C.

In some embodiments, the nanocomposite has a band gap of 1.40 to 2.5 eV, preferably 1.45 to 2.4 eV, preferably 1.50 to 2.35 eV. In some embodiments, the band gap decreases as the molar ratio of the rare-earth substituted mixed ternary transition metal ferrite to the ferroelectric perovskite oxide increases. In some embodiments, nanocomposites having a molar ratio of the rare-earth substituted mixed ternary transition metal ferrite to the ferroelectric perovskite oxide of less than 0.1:1 have a band gap of 2 to 2.5, preferably 2.25 to 2.4, preferably 2.32 eV. In some embodiments, nanocomposites having a molar ratio of the rare-earth substituted mixed ternary transition metal ferrite to the ferroelectric perovskite oxide of 0.1:1 to less than 0.20:1 have a band gap of 1.6 to 2, preferably 1.65 to 1.8, preferably 1.71 eV. In some embodiments, nanocomposites having a molar ratio of the rare-earth substituted mixed ternary transition metal ferrite to the ferroelectric perovskite oxide of 0.20:1 to 0.3:1 have a band gap of 1.51 to 1.59, preferably 1.52 to 1.54 eV.

In some embodiments, the nanocomposite has a saturation magnetization of 0.1 to 20 emu/g, preferably 0.25 to 19, preferably 0.5 to 18, preferably 0.75 to 17, preferably 0.9 to 16, preferably 1 to 15 at 0 to 40° C., preferably 10 to 35° C., preferably 20 to 30° C., preferably about 22 to 27° C., preferably about 25° C. (room temperature). In some embodiments, the saturation magnetization increases as the molar ratio of the rare-earth substituted mixed ternary transition metal ferrite to the ferroelectric perovskite oxide increases. In some embodiments, nanocomposites having a molar ratio of the rare-earth substituted mixed ternary transition metal ferrite to the ferroelectric perovskite oxide of less than 0.1:1 have a saturation magnetization of 0.1 to 2.5 emu/g at 0 to 50° C., preferably 10 to 40° C., preferably 20 to 30° C., preferably about 22 to 27° C., preferably about 25° C. (room temperature). In some embodiments, nanocomposites having a molar ratio of the rare-earth substituted mixed ternary transition metal ferrite to the ferroelectric perovskite oxide of 0.1:1 to less than 0.2:1 have a saturation magnetization of 1 to 5 emu/g at 0 to 50° C., preferably 10 to 40° C., preferably 20 to 30° C., preferably about 22 to 27° C., preferably about 25° C. (room temperature). In some embodiments, nanocomposites having a molar ratio of the rare-earth substituted mixed ternary transition metal ferrite to the ferroelectric perovskite oxide of 0.2:1 to less than 0.3:1 have a saturation magnetization of 5 to 10 emu/g at 0 to 50° C., preferably 10 to 40° C., preferably 20 to 30° C., preferably about 22 to 27° C., preferably about 25° C. (room temperature). In some embodiments, nanocomposites having a molar ratio of the rare-earth substituted mixed ternary transition metal ferrite to the ferroelectric perovskite oxide of greater than 0.3:1 have a saturation magnetization of 10 to 15 emu/g at 0 to 50° C., preferably 10 to 40° C., preferably 20 to 30° C., preferably about 22 to 27° C., preferably about 25° C. (room temperature). In some embodiments, the nanocomposite has a magnetic coercivity of 10 to 2000 Oe, preferably 100 to 1900 Oe, preferably 250 to 1750 Oe, preferably 500 to 1500 Oe, preferably 750 to 1250 Oe, preferably 900 to 1100 Oe at 0 to 50° C., preferably 10 to 40° C., preferably 20 to 30° C., preferably about 22 to 27° C., preferably about 25° C. (room temperature). In some embodiments, the nanocomposite has a coercivity as described above for molar ratios of the rare-earth substituted mixed ternary transition metal ferrite to the ferroelectric perovskite oxide of greater than 0.1:1.

The nanocomposite of the present disclosure may find use as a component of a magnetoelectronic device. Examples of magnetoelectronic devices include, but are not limited to sensors such as magnetoresistance sensors and AC magnetic field sensors, spin valves, spin filters, electromagnetic radiation filters, electromagnetic radiation oscillators, electromagnetic radiation phase shifters, computer memory devices such as magnetic random access memory (MRAM) and multiferroic random access memory (MFRAM), data storage devices, photovoltaic devices, thermoelectric devices, and cooling devices.

The present disclosure also relates to a method of forming the nanocomposite, the method comprising mixing ferroelectric perovskite oxide particles and rare-earth substituted mixed ternary transition metal ferrite particles to form a particle mixture, milling the particle mixture to form a precursor powder, pressing the precursor powder to form a pellet, and sintering the pellet to form the nanocomposite.

The mixture may be milled by a technique such as milling, grinding, ball milling, chopping, pulverizing, crushing, pounding, mincing, shredding, smashing, fragmenting, or another technique that may be used to reduce a material to small particles. In some embodiments, the milling may take place using a mill, ball mill, rod mill, autogenous mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles. In some embodiments, the milling is ball milling. In some embodiments, the ball milling takes place in a high-energy ball mill. Non-limiting examples of milling media (i.e. bowl and balls) include stainless steel, zirconium dioxide, tungsten carbide, silicon nitride, and alumina. In one embodiment, stainless steel milling media is employed to minimize contamination of the powder mixture. The balls used for milling may have a diameter of 200 to 1,000 m, preferably 300 to 900 m, preferably 400 to 800 m, preferably 600 to 650 m, though balls with diameters smaller than 200 am, or greater than 1,000 m may be used. In one embodiment, a weight ratio of the balls to the powder mixture ranges from 4:1 to 35:1, preferably from 5:1 to 30:1, preferably from 7.5:1 to 25:1, preferably from 9:1 to 15:1. In some embodiments, the milling is performed in an inert atmosphere, preferably provided by inert gas such as argon gas, though in another embodiment, the milling may be performed in air. In some embodiments, the milling is performed at ambient temperature (i.e. 23 to 26° C.). A high-energy ball milling apparatus may use a rotation rate of 100 to 10,000 rpm, preferably 200 to 5,000 rpm, preferably 300 to 3,000 rpm, preferably 400 to 2,000 rpm, preferably 500 to 1,000 rpm.

In some embodiments, the pressing is performed at 900 to 1100 MPa, preferably 910 to 1075 MPa, preferably 920 to 1050 MPa, preferably 930 to 1025 MPa, preferably 940 to 990 MPa, preferably 950 to 980 MPa, preferably 960 to 975 MPa, preferably 970 MPa. In some embodiments, the sintering is performed at 850 to 1350° C., preferably 875 to 1325° C., preferably 900 to 1300° C., preferably 925 to 1275° C., preferably 950 to 1250° C., preferably 975 to 1225° C., preferably 100 to 1200° C., preferably 1025 to 1175° C., preferably 1050 to 1150° C., preferably 1075 to 1125° C., preferably 1090 to 1110° C., preferably 1100° C. In some embodiments, the sintering is performed for 1 to 6 hours, preferably 1.5 to 5.75 hours, preferably 2 to 5.5 hours, preferably 2.5 to 5.25 hours, preferably 3 to 5 hours, preferably 3.25 to 4.75 hours, preferably 3.5 to 4.5 hours, preferably 3.75 to 4.25 hours, preferably 4 hours.

In some embodiments, the rare-earth substituted mixed ternary transition metal ferrite is $Co_{1-x}Zn_xTm_yFe_{2-y}O_4$ (x and y being in the ranges discussed above) and is prepared using a sonochemical process by mixing a cobalt (II) source, a zinc (II) source, an iron (III) source, and a thulium source in a solvent to form a precursor solution, adding a base to the precursor solution to form a reaction mixture having a pH of 11 to 12, ultrasonically treating the reaction mixture to form a precipitate, and drying the precipitate to form the rare-earth substituted mixed ternary transition metal ferrite. In some embodiments, the ultrasonic treatment is performed at a frequency of 18 to 25 kHz, preferably 18.5 to 22.5 kHz, preferably 19 to 21 kHz, preferably 19.5 to 20.5 kHz, preferably 20 kHz. In some embodiments, the ultrasonic treatment is performed at a power of 50 to 100 W, preferably 52.5 to 95 W, preferably 55 to 90 W, preferably 57.5 to 85 W, preferably 60 to 80 W, preferably, 62 to 78 W, preferably 64 to 76 W, preferably 66 to 74 W, preferably 68 to 72 W, preferably 70 W. In some embodiments, the ultrasonic treatment is performed for 30 to 120 minutes, preferably 40 to 105 minutes, preferably 45 to 90 minutes, preferably 50 to 75 minutes, preferably 55 to 65 minutes, preferably 60 minutes.

In some embodiments, the solvent is water. In some embodiments, the solvent is a mixture of water and an organic solvent miscible with water. Examples of organic solvents which are miscible with water include, but are not limited to acetaldehyde, acetic acid, acetone, acetonitrile, 1,2-butanediol, 1,3-butanediol, 1,4-nutanediol, 2-butoxyethanol, butyric acid, diethanolamine, diethylenetriamine, dimethylformamide, dimethoxyethane, dimethyl sulfoxide, 1,4-dioxane, ethanol, ethylamine, ethylene glycol, formic acid, furfuryl alcohol, glycerol, methanol, methyl diethanolamine, methyl isocyanide, N-methyl-2-pyrrolidone, 1-propanol, 1,3-propanediol, 1,5-pentanediol, 2-propanol, propanoic acid, propylene glycol, pyridine, tetrahydrofuran, and triethylene glycol.

In general, the cobalt (II) source may any suitable cobalt source which has appreciable solubility in the solvent (i.e. greater than about 1 g per 100 g of solvent) known to one of ordinary skill in the art. Examples of suitable cobalt (II) sources include, but are not limited to cobalt (II) chloride, cobalt (II) bromide, cobalt (II) iodide, cobalt (II) nitrate, cobalt (II) acetate, cobalt (II) formate, cobalt (II) sulfate, cobalt (II) perchlorate, cobalt (II) oxalate, and cobalt (II) tetrafluoroborate. In preferred embodiments, the cobalt (II) source is cobalt nitrate.

In general, the zinc (II) source may any suitable cobalt source which has appreciable solubility in the solvent (i.e. greater than about 1 g per 100 g of solvent) known to one of ordinary skill in the art. Examples of suitable zinc (II) sources include, but are not limited to zinc (II) chloride, zinc (II) bromide, zinc (II) iodide, zinc (II) nitrate, zinc (II) acetate, zinc (II) formate, zinc (II) sulfate, zinc (II) perchlorate, zinc (II) oxalate, and zinc (II) tetrafluoroborate. In preferred embodiments, the zinc (II) source is zinc nitrate.

In general, the iron (III) source may any suitable cobalt source which has appreciable solubility in the solvent (i.e. greater than about 1 g per 100 g of solvent) known to one of ordinary skill in the art. Examples of suitable iron (III) sources include, but are not limited to iron (III) chloride, iron (III) bromide, iron (III) iodide, iron (III) nitrate, iron (III) acetate, iron (III) formate, iron (III) sulfate, iron (III) perchlorate, iron (III) oxalate, and iron (III) tetrafluoroborate. In preferred embodiments, the iron (III) source is iron nitrate.

In general, the thulium source may any suitable cobalt source which has appreciable solubility in the solvent (i.e. greater than about 1 g per 100 g of solvent) known to one of ordinary skill in the art. Examples of suitable thulium sources include, but are not limited to thulium chloride, thulium bromide, thulium iodide, thulium nitrate, thulium acetate, thulium formate, thulium sulfate, thulium perchlorate, thulium oxalate, thulium tetrafluoroborate, and thulium oxide. If thulium oxide does not have an appropriate solubility in the solvent, a solution comprising thulium oxide and an acid may be prepared in which the thulium oxide is dissolved. Such a solution may be referred to as an acid solution. This acid solution may be used to introduce the thulium oxide into the solvent. In some preferred embodiments, the thulium source is thulium nitrate. In alternative preferred embodiments, the thulium source is an acid solution of thulium oxide.

In general, the base may be any suitable base known to one of ordinary skill in the art. Preferably, the base is a Brönsted base. In some embodiments, the base is a hydroxide base. In some embodiments, the base is an alkali metal hydroxide. In preferred embodiments, the base is sodium hydroxide.

The examples below are intended to further illustrate protocols for the preparation and characterization of the nanocomposite as well as structural, electronic, magnetic, and optical properties of exemplary embodiments of the current invention and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Nanoparticles of $Co_{0.7}Zn_{0.3}Tm_{0.01}Fe_{1.99}O_4$ have been prepared via sonochemical approach. Accordingly, cobalt nitrate hexahydrate $(Co(NO_3)_2 \cdot 6H_2O)$, zinc nitrate $(Zn(NO_3)_2)$, iron (III) nitrate nonahydrate $(Fe(NO_3)_3 \cdot 9H_2O)$ and thulium oxide $(Tm_2O_3)$ were used as initial materials. In a beaker, stoichiometric amounts of various nitrates were dissolved in deionized water under continuous stirrer by using a magnetic stirrer. In another beaker, a specific amount of $Tm_2O_3$ was dissolved in about 12 ml of concentrated hydrochloric acid under continuous stirrer. Then, the two solutions were mixed together into one beaker. After that, NaOH solution was added to the main solution to arrange the pH at about 11.5. The obtained mixed solution was subjected to high intensity of ultrasonic irradiation (frequency of 20 kHz and power of 70 W) for about 1 hour. The final product was washed several times using deionized water, and then dried at 70° C. for 12 h to get the final powder product of $Co_{0.7}Zn_{0.3}Tm_{0.01}Fe_{1.99}O_4$ nanosized spinel ferrite.

Powder of $BaTiO_3$ nanoparticles with high purity (99.9%), obtained from US Research Nanomaterials, was grinded using a planetary high-energy ball mill (Retch PM 200) for 4 h under speed rotation of 600 rpm to further reduce the grains size of $BaTiO_3$ nanoparticles.

The nanocomposite products of $BaTiO_3/(Co_{0.7}Zn_{0.3}Tm_{0.01}Fe_{1.99}O_4)_x$ where x=0, 5, 10, 20, 30 and 100% were prepared by stoichiometric concentrations of nanoparticles of $BaTiO_3$ and $Co_{0.7}Zn_{0.3}Tm_{0.01}Fe_{1.99}O_4$ spinel ferrites were mixed and grinded in the ball mill for 2 h. Then, the mixed powders with various x ratios were compacted into the form of pellets by using a hydraulic press at a pressure of 970 MPa. Some drops of polyvinyl alcohol (PVA) solution were utilized as a binder. Finally, the obtained pellets were sintered at 1100° C. for 4 h.

Structure

X-ray diffraction (XRD) patterns of various $BaTiO_3/(Co_{0.7}Zn_{0.3}Tm_{0.01}Fe_{1.99}O_4)_x$ nanocomposites where x=0, 5, 10, 20, 30 and 100% are presented in FIG. 1. XRD analysis indicated the successful formation of the desired nanocomposites. x=0.0% refers to the composition of pure $BaTiO_3$ (noted BTO hereafter) nanoparticles. All observed peaks belong to the BTO phase. A splitting of (002/200) peak at about 450 was noticed, which indicate that BTO phase has tetragonal structure and hence the prepared BTO nanomaterials display ferroelectricity. x=100% indicates the composition of the pure $Co_{0.7}Zn_{0.3}Tm_{0.01}Fe_{1.99}O_4$ spinel ferrite (noted CZTFO hereafter).

In various produced nanocomposites (x=2 up to 20%), XRD analyses confirmed the co-existence of tetragonal BTO and CZTFO spinel ferrite phases. Such structure is mandatory to establish the interactions among ferroelectricity and ferrimagnetism in the composite samples.

Morphology

The surface morphologies of $BaTiO_3/(Co_{0.7}Zn_{0.3}Tm_{0.01}Fe_{1.99}O_4)_x$ nanocomposites where x=0, 5, 10, 20, and 30% were investigated by scanning electron microscopy (SEM). SEM micrographs are displayed in FIG. 2A-2E.

SEM image of $BaTiO_3$ (x=0%, FIG. 2A) product shows spherical nanosized particles. The SEM images of various produced nanocomposite products (x=5-30%, FIGS. 2B-2E) show two different morphologies of grains that are randomly oriented, well grown, dense and packed. These different distribution of grains with different shapes inferring the presence of $BaTiO_3$ and $Co_{0.7}Zn_{0.3}Tm_{0.01}Fe_{1.99}O_4$ phases. Compared to free $BaTiO_3$ product (i.e. x=0%), the average grains size of $BaTiO_3$ phase is decreased in $BaTiO_3/$ $(Co_{0.7}Zn_{0.3}Tm_{0.01}Fe_{1.99}O_4)_x$ nanocomposites.

Optical Study

Figure 3A:
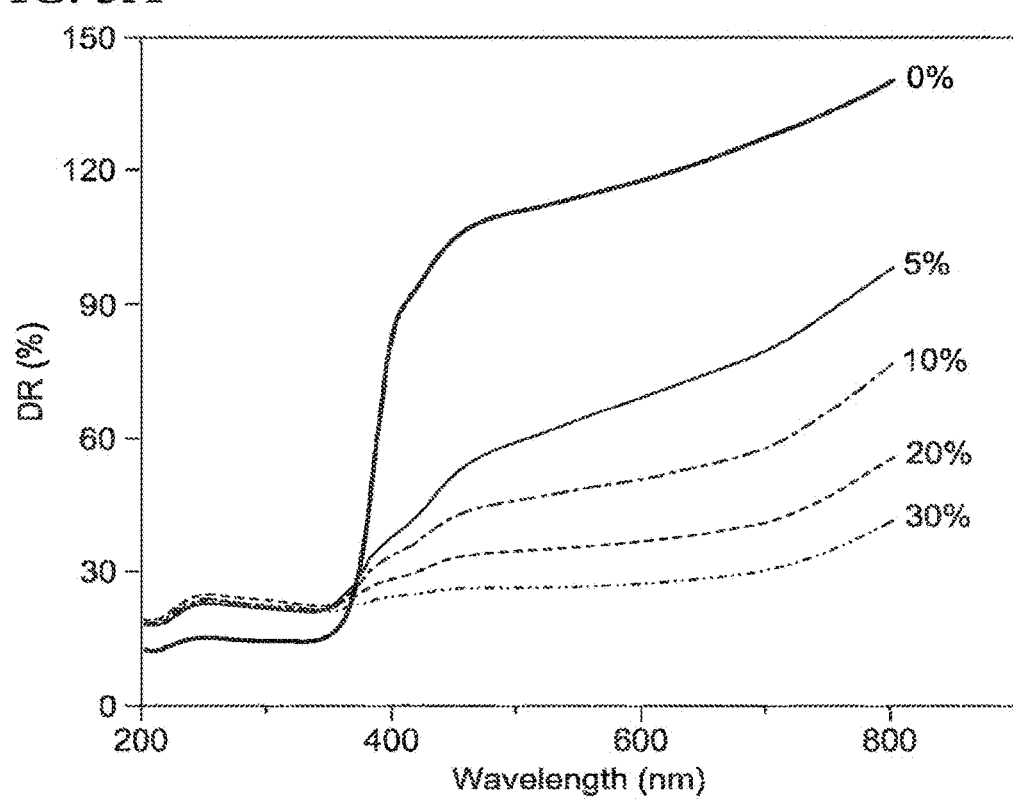
FIG. 3A shows diffuse reflectance spectra of various prepared $BaTiO_3/(Co_{0.7}Zn_{0.3}Tm_{0.01}Fe_{1.99}O_4)_x$ nanocomposites where x=0, 5, 10, 20, and 30%.

FIG. 3A presents the Ultra Violet-visible diffuse reflectance spectra (UV-vis DRS) in the wavelength range of 200-800 nm of various prepared $BaTiO_3/$ $(Co_{0.7}Zn_{0.3}Tm_{0.01}Fe_{1.99}O_4)_x$ nanocomposite products. These measurements are useful to determine the optical band gap energy ($E_g$), which is one of the important features specifically when optical devices are designed.

Figure 3B:
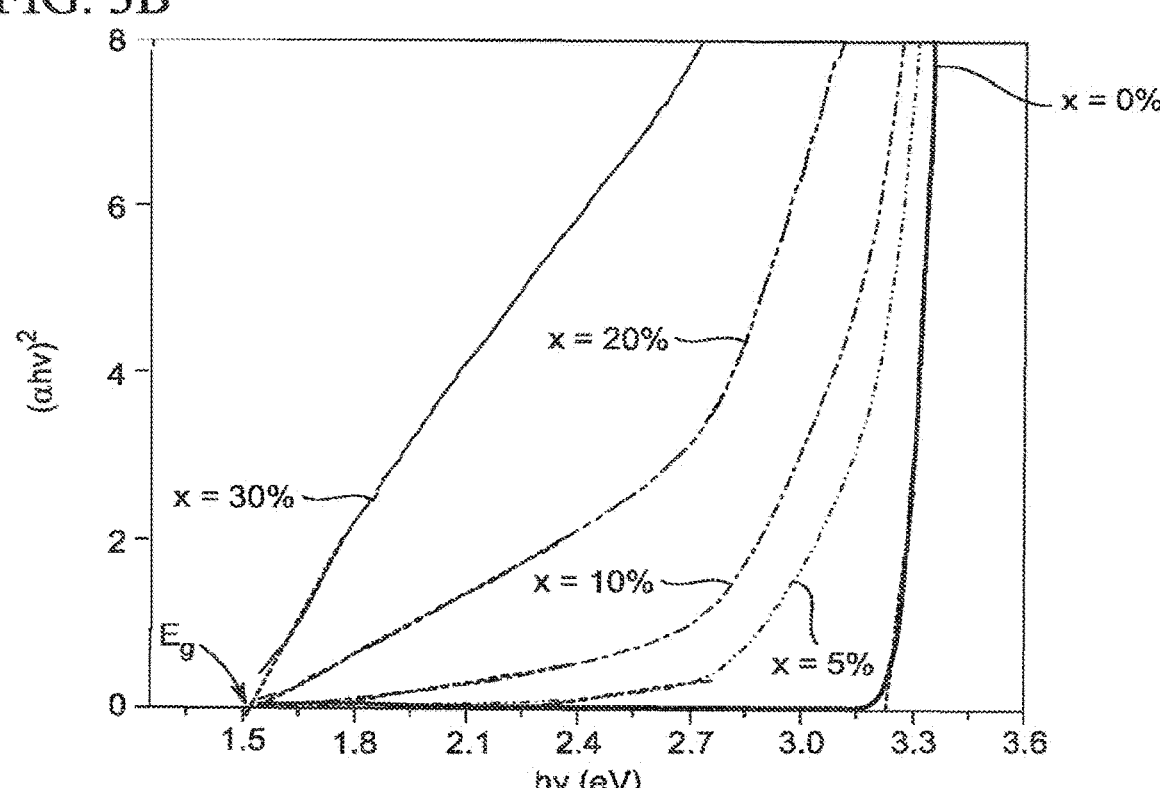
FIG. 3B shows Tauc plots of various prepared $BaTiO_3/(Co_{0.7}Zn_{0.3}Tm_{0.01}Fe_{1.99}O_4)_x$ nanocomposites where x=0, 5, 10, 20, and 30%.

Using UV-vis DRS spectra, Tauc plots that are the curves of $(\alpha h v)^2$ against photon energy (hv) can be plotted, and hence the $E_g$ values of the present nanocomposite products will be estimated as shown in FIG. 3B. The value of band gap ($E_g$) corresponding to $BaTiO_3$ nanoparticles (x=0%) displays $E_g$ value equal to 3.23 eV. As the concentration (x) of CZTFO spinel ferrite increases, the $E_g$ value decreases. $E_g$ values are equal to 3.23, 2.32, 1.71, 1.54, 1.52, 1.49 eV for x=0, 5, 10, 20, 30, and 100%, respectively.

The obtained findings showed the possibility to easy control the optical band gap over an interval of energies by simple manipulation and control of the molar ratios between ferroelectric and superparamagnetic phases.

Magnetic Investigation

Figure 4A:
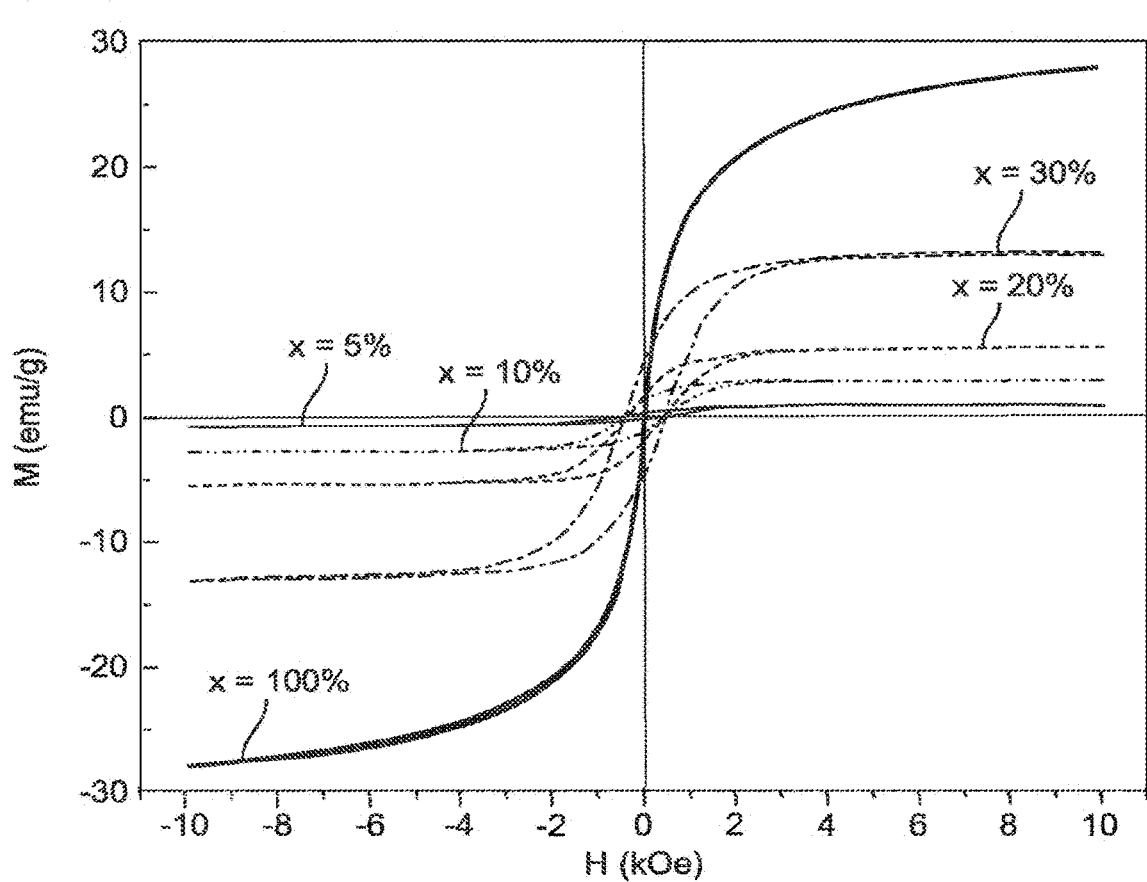
FIGS. 4A-4B show plots of magnetization versus applied magnetic field (M-H) hysteresis loops of various prepared $BaTiO_3/(Co_{0.7}Zn_{0.3}Tm_{0.01}Fe_{1.99}O_4)_x$ nanocomposite products where
Figure 4B:
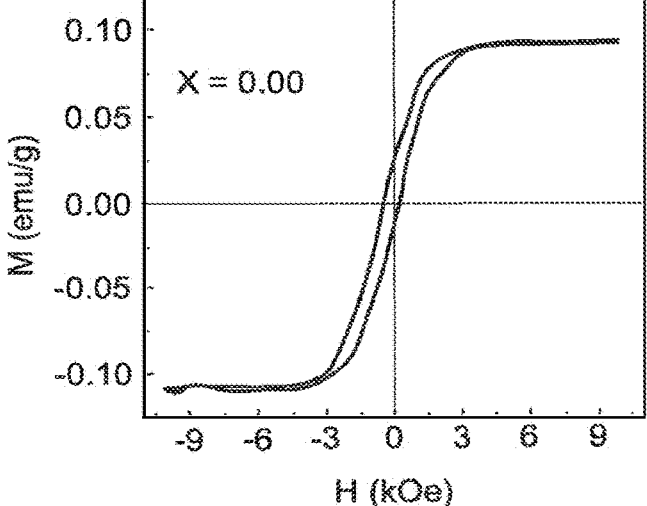

FIGS. 4A-4B show the curves of magnetization against applied magnetic field M-H for various prepared various prepared $BaTiO_3/(Co_{0.7}Zn_{0.3}Tm_{0.01}Fe_{1.99}O_4)_x$ nanocomposite products where x=0 (FIG. 4B) and where x=5, 10, 20, 30, and 100% (FIG. 4A).

$BaTiO_3$ nanoparticles (x=0.00) show narrow M-H hysteresis loops, which reflect that they are soft ferromagnetic behavior. This ferromagnetism might come from the magnetic moments that result from the oxygen deficiencies on the surface of nanoparticles.

$Co_{0.7}Zn_{0.3}Tm_{0.01}Fe_{1.99}O_4$ spinel ferrites (i.e. x=100%) show closed hysteresis loops with no remanence and no coercivity, which reflect that they are superparamagnetic nanomaterials. The various prepared nanocomposite products (x=5 up to 30%) display hysteresis loops, indicating their magnetic behaviors. It is observed that the saturation magnetization ($M_s$) increases with increasing x content. The coercive field ($H_c$) is large for various nanocomposite products.

The observed results indicated also the opportunity to control easily the magnetic properties by a simple manipulation and control of the molar ratios between ferroelectric and superparamagnetic phases.

Dielectric Properties

Figure 5A:
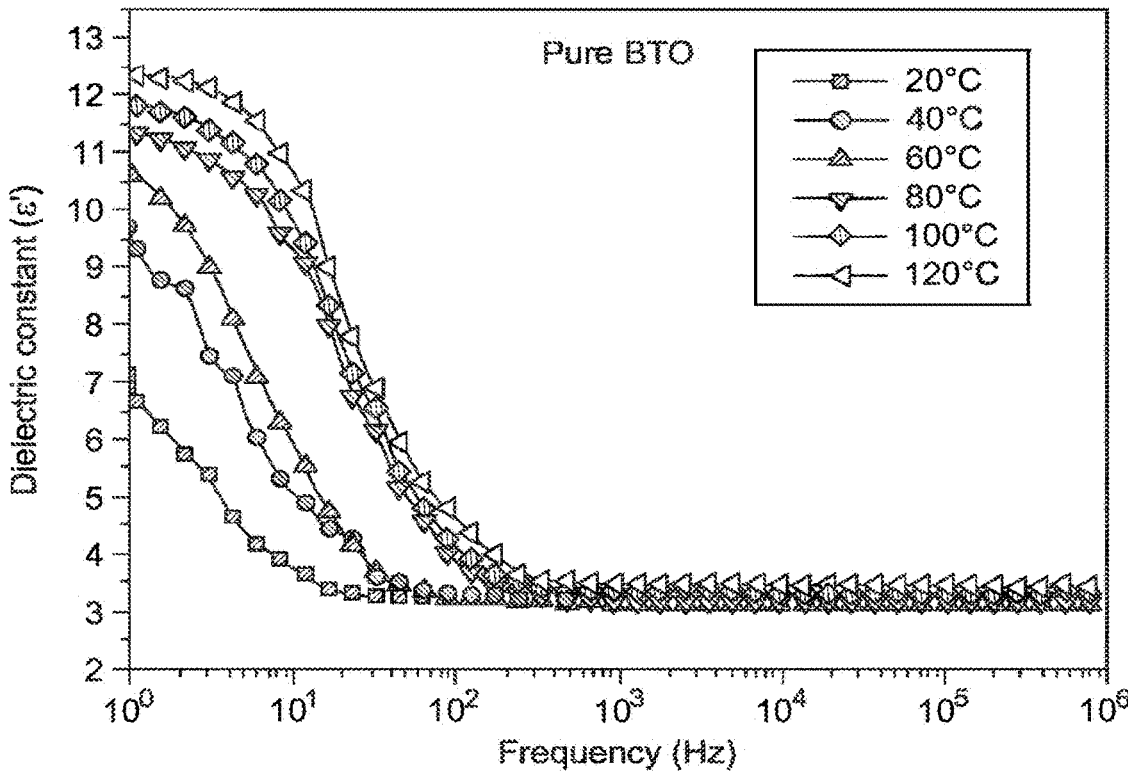
FIGS. 5A-5B show the frequency dependence of the dielectric constant $\varepsilon'$ in the temperature range from 20 to 120° C., where
Figure 5B:
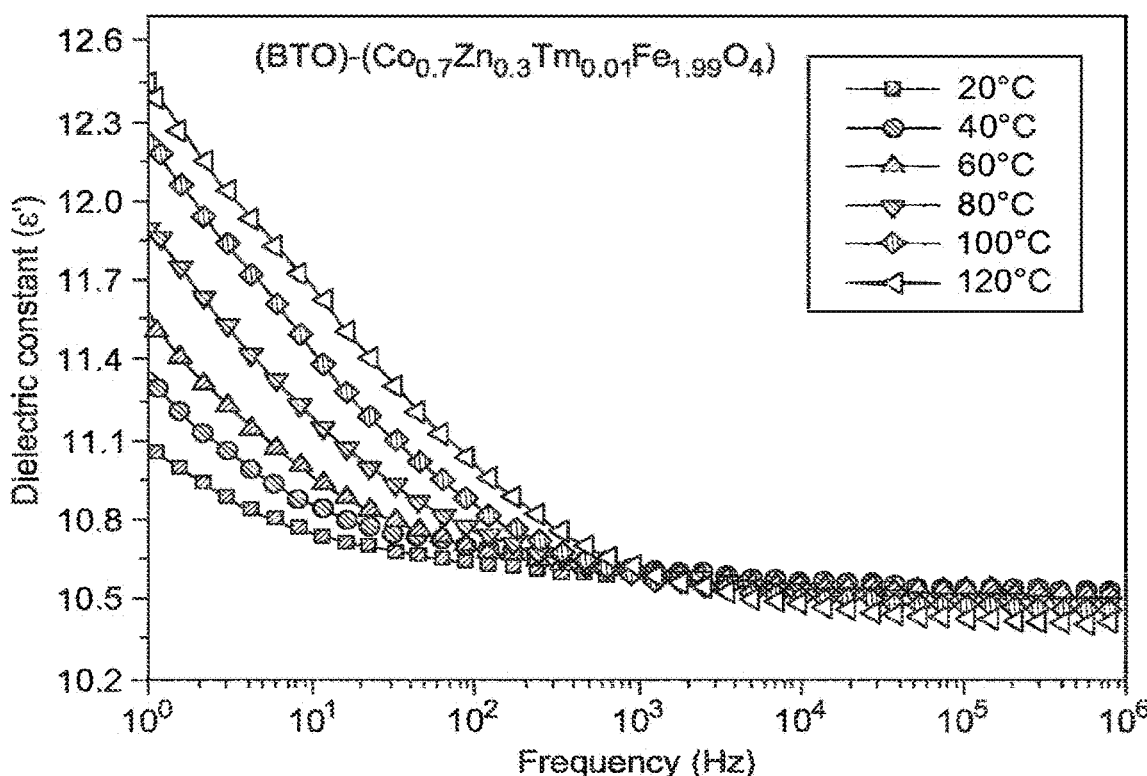

The study of the dielectric properties of materials is an essential tool for the possibility to integrate these nanocomposites into microelectronic application devices. FIGS. 5A-5B shows the variations of the dielectric permittivity (C') as a function of frequency (1 to 1 MHz) at different temperatures (20 to 120° C.) of pure $BaTiO_3$ nanoparticles (FIG. 5A) and $BaTiO_3/(Co_{0.7}Zn_{0.3}Tm_{0.01}Fe_{1.99}O_4)_{10\%}$ nanocomposite (FIG. 5B).

There is a high dielectric constant at low frequency for $BaTiO_3$ product, which is a usual behavior of ferroelectric material and that is due to polarization. The value of ε' stabilizes at 3 for pure $BaTiO_3$ product and at 10.5 for $BaTiO_3/(Co_{0.7}Zn_{0.3}Tm_{0.01}Fe_{1.99}O_4)_{10\%}$ nanocomposite, respectively. So, the nanocomposite with 10% of CZTFO spinel ferrite showed higher dielectric constant compared to pure BTO sample.

It is interesting to note that the $BaTiO_3/$ $(Co_{0.7}Zn_{0.3}Tm_{0.01}Fe_{1.99}O_4)_{10\%}$ nanocomposite shows more frequency stability compared to the pure $BaTiO_3$. Indeed, ε' varies slightly from 10.5 to 12.3 for the $BaTiO_3/$ $(Co_{0.7}Zn_{0.3}Tm_{0.01}Fe_{1.99}O_4)_{10\%}$ nanocomposite, while it varies widely from 3 to 13 for free $BaTiO_3$ nanoparticles.

Figure 6A:
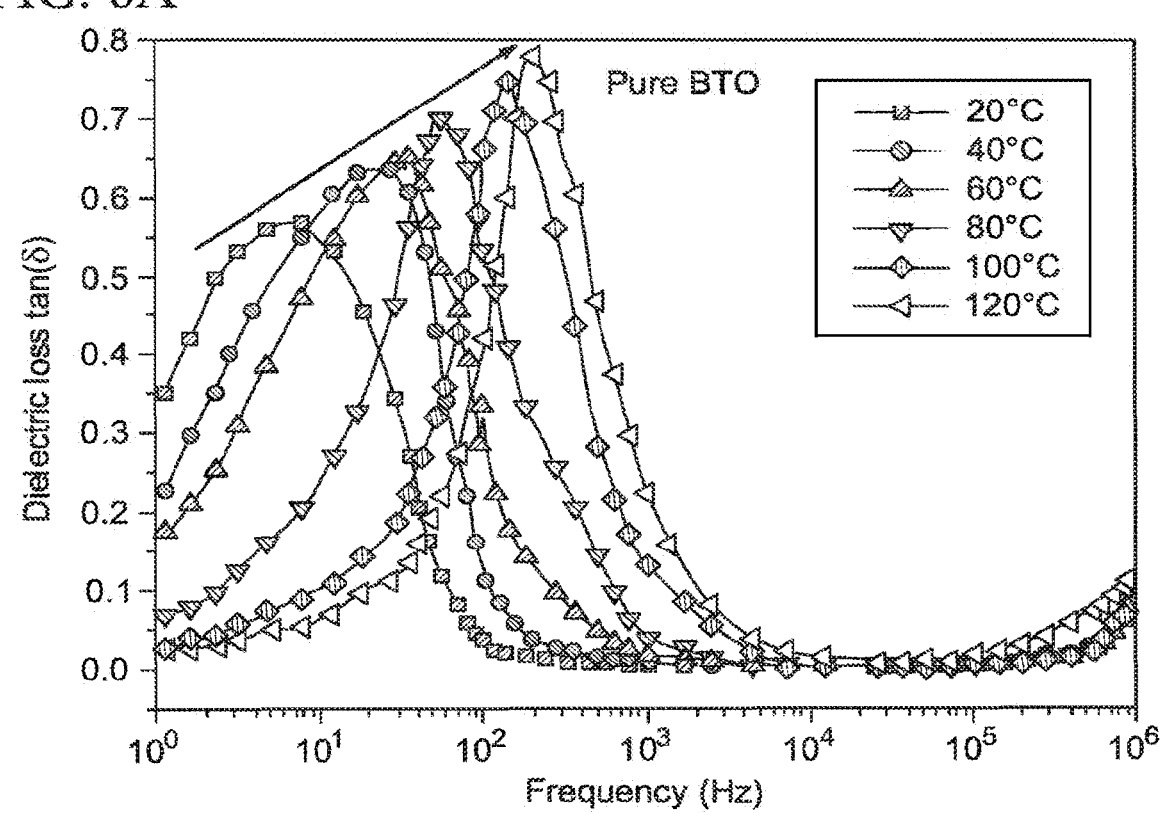
FIGS. 6A-6B show frequency dependence of tan(δ) in the temperature range from 20 to 120° C., where
Figure 6B:
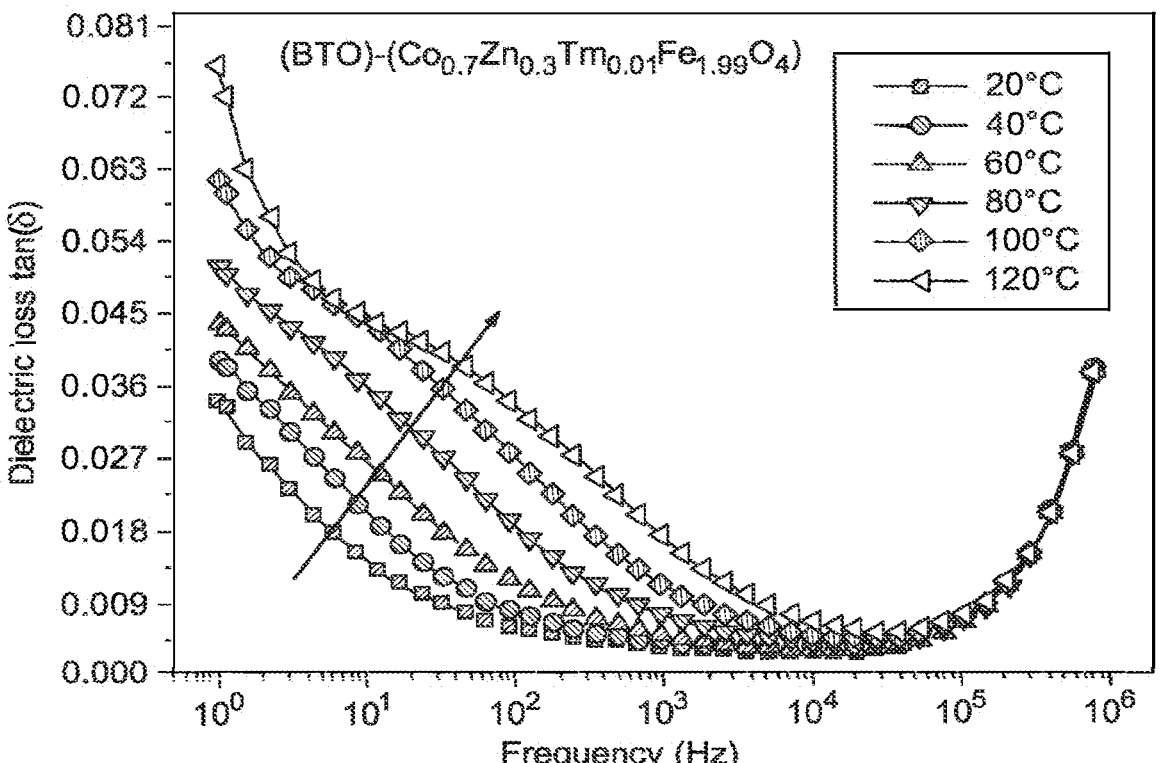

FIGS. 6A-6B shows the variations of the dielectric loss tangent (tgδ=ε''/ε') as a function of frequency at different temperature for the free $BaTiO_3$ nanoparticles (FIG. 6A) and $BaTiO_3/(Co_{0.7}Zn_{0.3}Tm_{0.01}Fe_{1.99}O_4)^{10\%}$ nanocomposite (FIG. 6B).

A loss peak was observed in the case of free $BaTiO_3$ sample, whereas no clear loss peaks is noticed in the $BaTiO_3/(Co_{0.7}Zn_{0.3}Tm_{0.01}Fe_{1.99}O_4)_{10\%}$ nanocomposite product.

It is clearly obvious that the nanocomposite product of $BaTiO_3/(Co_{0.7}Zn_{0.3}Tm_{0.01}Fe_{1.99}O_4)_{10\%}$ displayed lower dielectric loss compared to the pure $BaTiO_3$ sample.

The more frequency stability, higher dielectric constant, and lower dielectric loss obtained for the $BaTiO_3/$ $(Co_{0.7}Zn_{0.3}Tm_{0.01}Fe_{1.99}O_4)_{10\%}$ nanocomposite product compared to pure $BaTiO_3$ sample indicated that this nanocomposite is a promising candidate for producing modern advanced microelectronics devices, sensors and antennas technologies.

The invention claimed is:

1. A method of forming a nanocomposite, comprising:
mixing ferroelectric perovskite oxide particles and rare-earth substituted mixed ternary transition metal ferrite particles to form a particle mixture, wherein the mixing includes combining a solution of Thulium oxide with a solution of transition metal nitrate salts to form the perovskite oxide particles and the rare-earth substituted mixed ternary transition metal ferrite particles;
milling the particle mixture to form a precursor powder;
pressing the precursor powder to form a pellet; and
sintering the pellet to form the nanocomposite;
wherein the rare-earth substituted mixed ternary transition metal ferrite particles are of formula $$A_{1-x}B_xR_yFe_{2-y}O_4,$$

wherein A and B represent different transition metals;
$0<x<1$;
R is Thulium;
$0<y<0.2$; and
the rare-earth substituted mixed ternary transition metal ferrite particles are superparamagnetic at 0 to 50° C. and comprise tetragonal $BaTiO_3$ (BTO) and $Co_{0.7}Zn_{0.3}Tm_{0.01}Fe_{1.99}O_4$ (CZTFO) spinel ferrite phases.

2. The method of claim 1, wherein the ferroelectric perovskite oxide particles are lead-free $BaTiO_3$.

3. The method of claim 1, wherein the ferroelectric perovskite oxide particles have a mean particle size of less than 1000 nm.

4. The method of claim 1, wherein A is cobalt.

5. The method of claim 1, wherein B is zinc.

6. The method of claim 1, wherein $0.1 \le x < 0.5$.

7. The method of claim 1, wherein the rare-earth substituted mixed ternary transition metal ferrite particles are substantially free of nickel.

8. The method of claim 1, wherein $0.001 \leq y \leq 0.1$.

9. The method of claim 1, wherein the rare-earth substituted mixed ternary transition metal ferrite particles have a mean particle size of 10 nm to 5 $\mu$m.

10. The method of claim 1, wherein a molar ratio of the rare-earth substituted mixed ternary transition metal ferrite particles to the ferroelectric perovskite oxide particles is 0.05:1 to 0.5:1.

11. The method of claim 1, wherein the nanocomposite has a dielectric constant ($\varepsilon'$) of 10 to 15 for frequencies of $10^0$ to $10^6$ Hz at 0 to 140° C.

12. The method of claim 1, wherein the nanocomposite has a dielectric loss tangent of 0 to 0.1 for frequencies of $10^0$ to $10^6$ Hz at 0 to 140° C.

13. The method of claim 1, wherein the nanocomposite has a band gap of 1.40 to 2.5 eV.

14. The method of claim 1, wherein the nanocomposite has a saturation magnetization of 0.1 to 20 emu/g at 0 to 50° C. and a magnetic coercivity of 10 to 2000 Oe at 0 to 50° C.

15. A method of forming a nanocomposite, comprising:
mixing ferroelectric perovskite oxide particles and rare-earth substituted mixed ternary transition metal ferrite particles to form a particle mixture, wherein the mixing includes combining a solution of a rare earth oxide with a solution of transition metal nitrate salts to form the perovskite oxide particles and the rare-earth substituted mixed ternary transition metal ferrite particles;
milling the particle mixture to form a precursor powder;
pressing the precursor powder to form a pellet; and
sintering the pellet to form the nanocomposite;
wherein the rare-earth substituted mixed ternary transition metal ferrite particles are of formula $$A_{1-x}B_xR_yFe_{2-y}O_4,$$

wherein A and B represent different transition metals:
$0<x<1$;
R is a rare-earth element;
$0<y<0.2$; and
the rare-earth substituted mixed ternary transition metal ferrite particles are superparamagnetic at 0 to 50° C. and comprise tetragonal $BaTiO_3$ (BTO) BTO and $Co_{0.7}Zn_{0.3}Tm_{0.01}Fe_{1.99}O_4$ (CZTFO) spinel ferrite phases,
wherein the pressing is performed at 900 to 1100 MPa.

16. The method of claim 1, wherein the sintering is performed at 850 to 1350° C. for 1 to 6 hours.

17. A method of forming a nanocomposite, comprising:
mixing ferroelectric perovskite oxide particles and rare-earth substituted mixed ternary transition metal ferrite particles to form a particle mixture, wherein the mixing includes combining a solution of a rare earth oxide with a solution of transition metal nitrate salts to form the perovskite oxide particles and the rare-earth substituted mixed ternary transition metal ferrite particles;
milling the particle mixture to form a precursor powder;
pressing the precursor powder to form a pellet; and
sintering the pellet to form the nanocomposite;
wherein the rare-earth substituted mixed ternary transition metal ferrite particles are of formula $$A_{1-x}B_xR_yFe_{2-y}O_4,$$

wherein A and B represent different transition metals:
$0<x<1$;
R is a rare-earth element;
$0<y<0.2$; and
the rare-earth substituted mixed ternary transition metal ferrite particles are superparamagnetic at 0 to 50° C. and comprise tetragonal $BaTiO_3$ (BTO) and $Co_{0.7}Zn_{0.3}Tm_{0.01}Fe_{1.99}O_4$ (CZTFO) spinel ferrite phases,
wherein the rare-earth substituted mixed ternary transition metal ferrite particles are prepared by:
mixing a cobalt (II) source, a zinc (II) source, an iron (III) source, and a thulium source in a solvent to form a precursor solution;
adding a base to the precursor solution to form a reaction mixture having a pH of 11 to 12;
ultrasonically treating the reaction mixture at a frequency of 18 to 25 kHz and a power of 50 to 100 W to form a precipitate; and
drying the precipitate to form the rare-earth substituted mixed ternary transition metal ferrite particles.

18. The method of claim 17, wherein:
the cobalt (II) source is cobalt nitrate;
the zinc (II) source is zinc nitrate;
the iron (III) source is iron nitrate;
the thulium source is thulium oxide;
the base is sodium hydroxide; and
the ultrasonic treatment is performed for 30 to 120 minutes.

\* \* \* \* \*